United States Patent
Fujita et al.

(10) Patent No.: US 8,233,054 B2
(45) Date of Patent: Jul. 31, 2012

(54) SCENERY IMAGING APPARATUS, SCENERY IMAGING METHOD, SCENERY IMAGING PROGRAM, AND COMPUTER-READABLE RECORDING MEDIUM

(75) Inventors: Ryujiro Fujita, Saitama (JP); Kohei Ito, Saitama (JP)

(73) Assignee: Pioneer Corporation, Tokyo (JP)

( * ) Notice: Subject to any disclaimer, the term of this patent is extended or adjusted under 35 U.S.C. 154(b) by 490 days.

(21) Appl. No.: 12/442,643

(22) PCT Filed: Sep. 25, 2006

(86) PCT No.: PCT/JP2006/318980
§ 371 (c)(1),
(2), (4) Date: Apr. 16, 2009

(87) PCT Pub. No.: WO2008/050374
PCT Pub. Date: May 2, 2008

(65) Prior Publication Data
US 2010/0085440 A1      Apr. 8, 2010

(51) Int. Cl.
*H04N 5/228* (2006.01)
*H04N 7/18* (2006.01)
*G06K 9/00* (2006.01)
*G06K 9/46* (2006.01)
*G06K 9/66* (2006.01)
*G06K 9/62* (2006.01)

(52) U.S. Cl. ................................................ 348/222.1
(58) Field of Classification Search ............... 348/222.1; 382/162–167, 154, 223, 173; 701/200, 208, 701/210–211
See application file for complete search history.

(56) References Cited

U.S. PATENT DOCUMENTS

| | | | |
|---|---|---|---|
| 7,106,376 B1 * | 9/2006 | Anderson | 348/345 |
| 7,215,828 B2 * | 5/2007 | Luo | 382/289 |
| 7,262,798 B2 * | 8/2007 | Stavely et al. | 348/255 |
| 7,620,246 B2 * | 11/2009 | Akahori | 382/192 |
| 7,804,980 B2 * | 9/2010 | Sasaki | 382/103 |
| 2004/0022440 A1 * | 2/2004 | Akahori | 382/224 |
| 2005/0212950 A1 * | 9/2005 | Kanai | 348/345 |

FOREIGN PATENT DOCUMENTS

| | | |
|---|---|---|
| JP | 2000-244800 A | 9/2000 |
| JP | 2001-257920 A | 9/2001 |
| JP | 2003-198904 A | 7/2003 |
| JP | 2005-045398 A | 2/2005 |

* cited by examiner

*Primary Examiner* — Jason Chan
*Assistant Examiner* — Pritham Prabhakher
(74) *Attorney, Agent, or Firm* — Foley & Lardner LLP

(57) ABSTRACT

A scenery imaging apparatus includes a dividing unit that divides, into plural cells, a scenery image captured in an arbitrary direction, as an initial scenery image, by an image capturing unit; a calculating unit that calculates respective distances to portions of initial scenery respectively corresponding to the cells; a determining unit that determines an image capturing direction based on the distances calculated by the calculating unit; and a judging unit that judges, based on the distances calculated by the calculating unit, whether a portion of the initial scenery corresponding to a cell is a distant view. The determining unit further determines the image capturing direction based on a portion judged to be a distant view.

11 Claims, 13 Drawing Sheets

SCENERY IMAGING APPARATUS, SCENERY IMAGING METHOD, SCENERY IMAGING PROGRAM, AND COMPUTER-READABLE RECORDING MEDIUM

TECHNICAL FIELD

The present invention relates to a scenery imaging apparatus that captures an image of scenery, a scenery imaging method, a scenery imaging program, and a computer-readable recording medium. However, the application of the present invention is not limited to the scenery imaging apparatus, the scenery imaging method, the scenery imaging program, and the computer-readable recording medium.

BACKGROUND ART

When scenery such as the ocean, mountains, or a night view is encountered during operation of an automobile, it would be very convenient if a photograph of the scenery could be shot automatically or music be switched automatically according to the scenery. Recently, a technology has been proposed for preliminarily registering, at an information center, position information concerning points recommended for capturing images, downloading the position information through the Internet by a vehicle, and capturing images when a current position matches the positions of the recommended points (see, for example, Patent Document 1).

Patent Document 1: Japanese Patent Application Laid-Open Publication No. 2003-198904

DISCLOSURE OF INVENTION

Problem to be Solved by the Invention

However, for example, since position information concerning recommended points suitable for capturing images must be registered preliminarily in the above conventional technology, it is problematic that a user must perform troublesome operations such as selecting and registering the recommended points.

Further, for example, since the recommended points are preliminarily registered before driving, it is problematic that images associated with the recommended points are captured even when the scenery is not suitable for capturing images such as when the scenery changes due to weather conditions at the time of travel.

If a good view appears to the left (right) of a traveling vehicle, an image cannot be captured unless the recommended point has been registered. Therefore, it is problematic that a driver cannot take a close look at the view while driving nor check the view by a photograph later. If a passenger prepares a camera to take a picture of the good view, the passenger may miss the view and an image may not be captured after all.

Means for Solving Problem

To at least solve the problems above and achieve an object of the present invention, a scenery imaging apparatus, according to an embodiment of the invention, includes a dividing unit that divides a scenery image captured by an image capturing unit in an arbitrary direction (hereinafter, "initial scenery image") into a plurality of cells; a calculating unit that calculates a distance to a portion of the initial scenery corresponding to each of cells generated from division by the dividing unit; a determining unit that determines an image capturing direction based on distances calculated by the calculating unit; and a judging unit that judges whether a portion of the initial scenery corresponding to each of the cells is a distant view based on the distances calculated by the calculating unit, where the determining unit determines the image capturing direction based on the initial scenery image judged to be a distant view.

A scenery imaging method according to an embodiment of the invention, includes a dividing step of dividing a scenery image captured by an image capturing step in an arbitrary direction (hereinafter, "initial scenery image") into a plurality of cells; a calculating step of calculating a distance to a portion of the initial scenery corresponding to each of cells generated from division at the dividing step; a determining step of determining an image capturing direction based on distances calculated at the calculating step; and a judging step of judging whether a portion of the initial scenery corresponding to each of the cells is a distant view based on the distances calculated at the calculating step, where the determining step includes determining the image capturing direction based on the initial scenery image judged to be a distant view.

A scenery imaging program according to an embodiment of the invention causes a computer to execute a scenery imaging method according to an embodiment of the invention.

A computer-readable recording medium according to an embodiment of the invention stores therein the scenery imaging program according to an embodiment of the invention.

EXPLANATIONS OF LETTERS OR NUMERALS

Figure 1:
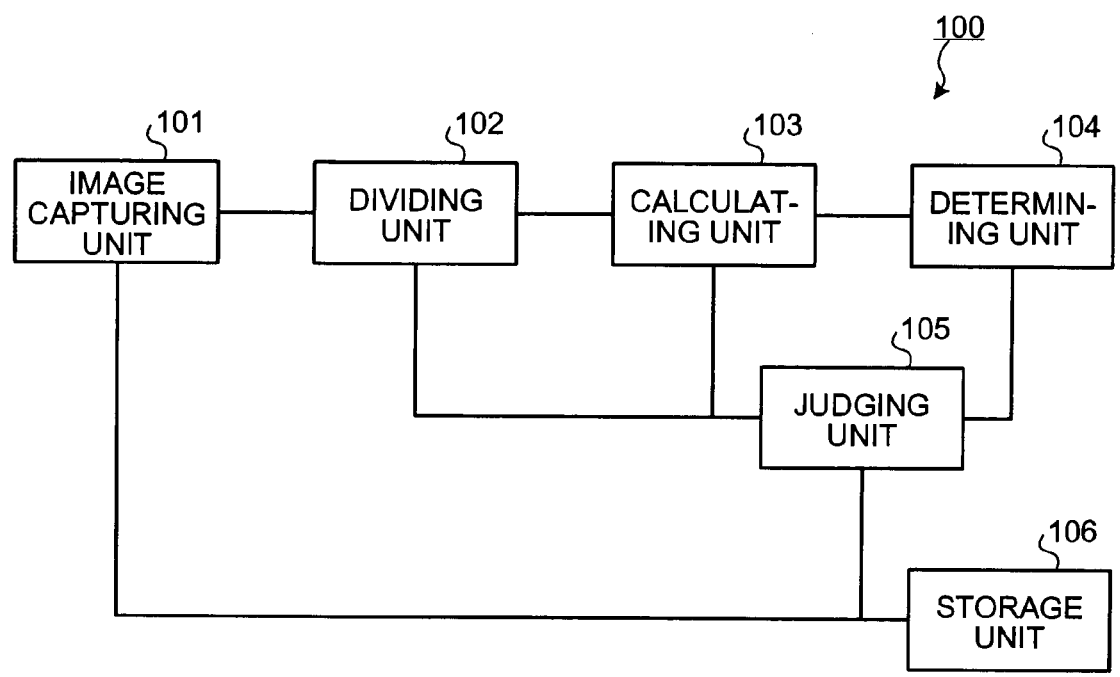
FIG. 1 is a block diagram of an exemplary functional configuration of a scenery imaging apparatus according to an embodiment.

100 scenery imaging apparatus
101 image capturing unit 102 dividing unit
103 calculating unit
104 determining unit
105 judging unit
106 storage unit

BEST MODE(S) FOR CARRYING OUT THE INVENTION

The preferred embodiment of a scenery imaging apparatus, a scenery imaging method, a scenery imaging program, and a computer-readable recording medium according to the present invention will be described with reference to the accompanying drawings.

EMBODIMENT

Functional Configuration of Scenery Imaging Apparatus

A functional configuration of a scenery imaging apparatus according to the embodiment will be described with reference to FIG. 1. FIG. 1 is a block diagram of an exemplary functional configuration of the scenery imaging apparatus according to the embodiment.

As depicted in FIG. 1, a scenery imaging apparatus 100 includes an image capturing unit 101, a dividing unit 102, a calculating unit 103, a determining unit 104, a judging unit 105, and a storage unit 106.

The image capturing unit 101 captures a scenery image in an arbitrary direction. Specifically, for example, the image capturing unit 101 may be a movable, on-board camera disposed on a mobile object and may capture an image in front of the mobile object.

The image capturing unit 101 may capture a scenery image in an image capturing direction determined by a determining unit 104 described hereinafter, for example. Specifically, for example, a scenery image in the image capturing direction (hereinafter, "pickup scenery image") is captured by driving a driving unit, not depicted, to turn the on-board camera toward the image capturing direction determined by the determining unit 104.

The dividing unit 102 divides, into plural cells, a scenery image captured by the image capturing unit 101 in an arbitrary direction (hereinafter, "initial scenery image"). The dividing unit 102 may divide the pickup scenery image captured by the image capturing unit 101 into plural cells.

For example, the cells are pieces of an image such as the initial scenery image or the pickup scenery image and are of a predetermined size. For example, if an image to be divided has 1280×1024 pixels, the predetermined size is desirably set to approximately 30×30 pixels or may be set depending on the precision and processing speeds of the calculating unit 103 and the judging unit 105 described hereinafter. If the entire image cannot be divided into uniform cells due to a relation between sizes of the image to be divided and the cells, the edges of the image may be excluded from the portion to be divided.

In initial scenery corresponding to the initial scenery image, the calculating unit 103 calculates distances to portions of the initial scenery corresponding to the cells generated from the division by the dividing unit 102. The distances to portions of the initial scenery corresponding to the cells may be, for example, relative distances between the portions of the initial scenery and a reference position of the image capturing unit 101, the scenery imaging apparatus 100, etc., and the calculating unit 103 calculates distances to portions of the scenery respectively corresponding to the cells from the reference position.

Specifically, for example, the distances may be calculated by calculating optical flows between two temporally sequential initial scenery images and calculating distances to portions of the initial scenery corresponding to pixels included in each cell based on the calculated optical flows. An average value of the distances to portions of the initial scenery corresponding to pixels included in each cell is then calculated as the distance to a portion of the initial scenery corresponding to a cell. The distance to be calculated may be calculated as infinite if the distance is very large as compared to other portions of the scenery, such as when a portion of the initial scenery corresponds to the sky, for example.

The determining unit 104 determines the image capturing direction using the distances calculated by the calculating unit 103. Specifically, for example, the determining unit 104 may calculate an angle and a distance for driving the driving unit, not depicted, to turn the image capturing unit 101 such that a scenery image can be captured in the determined image capturing direction.

The determining unit 104 may determine the image capturing direction based on a numerical quantity of cells judged by the judging unit 105, described hereinafter, to correspond to a portion of the initial scenery that is a distant view in an image area consisting of one or more cells in the initial scenery image. More specifically, for example, the image capturing direction may be determined by defining that a direction of a good view is an image area occupied by cells judged to be a distant view, among the cells in the image area.

The judging unit 105 uses the distances calculated by the calculating unit 103 to judge whether portions of the initial scenery respectively corresponding to the cells are distant views. A distant view means a portion corresponding to an arbitrary object portion when a distance to the arbitrary object portion making up the initial scenery is located further than a predetermined distance, for example. The predetermined distance may be, for example, a predetermined distance set in advance or may be a distance variably set depending on a type of scenery or preference of a user.

More specifically, for example, if the distance calculated by the calculating unit 103 is greater than a predetermined value, the judging unit 105 may judge that a portion of the initial scenery corresponding to the cell is a distant view (e.g., scenery at a long distance such as the sky, the ocean, and mountains), and if the distance is less than the predetermined value, the judging unit 105 may judge that the portion of the scenery corresponding to the cell is a close view (e.g., scenery at a short distance such as the road on which the vehicle travels and a vehicle travelling ahead). One or more scenes at intermediate distances may be defined between the distant view and the close view.

The judging unit 105, with respect to the pickup scenery corresponding to the pickup scenery image, judges whether portions of the pickup scenery respectively corresponding to the cells generated from the division by the dividing unit 102 correspond to at least one of the sky, the ocean, mountains, and a night view. For example, if at least one of the sky, the ocean, mountains, and a night view is set in advance, this judgment enables the storage unit 106, described hereinafter, to automatically store, while the vehicle is moving, scenery images corresponding to the distant view such as the sky, the ocean, mountains, and a night view set in advance. Alternatively, for example, music or video in the vehicle may be switched to music or video corresponding to the sky, the ocean, mountains, and a night view.

Specifically, for example, the judging unit 105, with respect to cells located on an upper side of the pickup scenery image, may judge whether a portion of the pickup scenery is the sky from variances of brightness of pixels included in the cells located on the upper side.

More specifically, for example, if color information concerning data corresponding to a cell is color information for the RGB system, the judging unit 105 converts this color information into color information for a color system having parameters of hue, saturation, and brightness (e.g., color information concerning the HLS system).

If the variances of brightness are equal to or less than a predetermined value (e.g., 10) for one cell to be judged and eight cells located nearby (i.e., eight adjacent cells), the judging unit 105 judges that the portion of the pickup scenery corresponding to the cell is the sky. If any one of the variances of brightness for the one cell to be judged and eight cells located in the vicinity (i.e., eight adjacent cells) is greater than the predetermined value (e.g., 10), the judging unit 105 judges that the portion of the pickup scenery corresponding to the cell is not the sky.

Such a configuration enables reliable judgment of whether portions of the pickup scenery respectively corresponding to the cells are the sky and, for example, weather conditions may also be judged such as blue sky, white clouds, black clouds, sunset sky, and night sky.

The judging unit 105, for example, with respect to a cell judged not to be the sky, may judge whether a portion of the pickup scenery is the ocean based on the average hue and the average saturation of pixels included in a cell judged to be the sky.

More specifically, for example, if the average hue (or color tone) of pixels included in a cell judged not to be the sky is within a predetermined range including the average hue of pixels included in a cell judged to be the sky and the average brightness of pixels included in the cell judged not to be the sky is equal to or less than the average brightness of pixels included in the cell judged to be the sky, the judging unit 105 may judge the cell to be the ocean.

Such configuration enables a judgment to be made concerning whether a portion of the pickup scenery is the ocean, reflecting a characteristic that the color of the ocean often reflects the color of the sky and turns to a deep color similar to the color of the sky, and enables an accurate judgment to be made concerning whether a portion of the pickup scenery is the ocean.

The judging unit 105 may judge whether the pickup scenery includes a mountain by detecting a boundary between the sky and scenery that is not the sky through the analysis of the nature of color for each of the cells that are adjacent to the cells judged to be the sky and among the cells judged not to be the sky.

More specifically, for example, if one cell has a certain rate or exceeds a certain rate of pixels determined as the color of the sky and has less than a certain rate of pixels not determined as the color of sky, the judging unit 105 judges that the cell is likely to include a ridge line. "Judged to be the color of the sky" means that hue, brightness, and saturation of a pixel are judged to be included in the ranges of hue, brightness, and saturation for the above judgment of the sky. The judging unit 105 judges that the scenery includes a mountain if a certain number of cells, or more, are judged to likely include a ridge line.

Such configuration enables a judgment to be made concerning whether scenery includes a mountain by detecting a ridge line and enables a judgment about a shape of a mountain or mountains by reducing the size of cells.

The judging unit 105, with respect to each cell, may judge whether a portion of the pickup scenery is a night view based on the number of pixel groups distinguished as exceeding a reference, among plural pixel groups distinguished by binarizing pixels using a predetermined value of brightness as a reference.

More specifically, for example, the judging unit 105 distinguishes pixel groups consisting of plural neighboring pixels having a brightness higher than a predetermined value (including one pixel having a brightness higher than a predetermined value adjacent to a pixel having a brightness equal to or less than the predetermined value) among pixels included in one cell through binarization such that pixels having a brightness higher than surrounding pixels are scattered in one cell in such a way that a multitude of white particles exists on a black background.

The judging unit 105 calculates the number of pixel groups including neighboring pixels that have a brightness higher than the predetermined value and judges that the cell is likely to include a night view if the number of the pixel groups including neighboring pixels that have a brightness higher than the predetermined value is greater than a predetermined value (e.g., 10). A night view means scenery at night including a lot of lights of buildings, residential streets, automobiles, etc., and the judging unit 105 judges that the scenery includes a night view if a certain number (e.g., 10) of cells, or more, are judged to likely include a night view.

Such configuration enables a judgment to be made concerning whether a portion of the pickup scenery is a night view, reflecting a characteristic that a night view often includes more light spots having a higher brightness than surroundings, and enables an accurate judgment to be made concerning whether a portion of the pickup scenery is a night view. A level or degree of a night view may be judged based on the number of cells judged to likely include a night view. The processing speed may be improved by limiting the cells to be judged with respect to the night view to only cells judged to be distant views. The judgment may further be limited to only a case in which a certain number (e.g., 10) of the cells, or more, are judged to be night sky in the above judgment concerning the sky.

Although the judging unit 105 makes a judgment concerning distant view for the initial scenery to make the judgment concerning the sky, the ocean, mountains, and a night view for the pickup scenery in the description of FIG. 1, configuration is not limited hereto. Specifically, for example, the judging unit 105 may make the judgment concerning distant view with respect to the pickup scenery and may make the judgment concerning the sky, the ocean, mountains, and a night view for the initial scenery.

The storage unit 106 stores the pickup scenery image depending on a judgment result at the judging unit 105. Specifically, for example, the storage unit 106 may be configured to store a pickup scenery image into a storage area of a storage device, not depicted, if the image is judged to be a pickup scenery image that includes the ocean and mountains in the judgment result. More specifically, for example, the storage unit 106 may be configured to automatically store the pickup scenery images satisfying conditions preliminarily defined by a user or factory default setting.

The storage unit 106 may store and correlate pickup scenery images with position information concerning the pickup scenery images.

(Details of Processing by the Scenery Imaging Apparatus 100)

Figure 2:
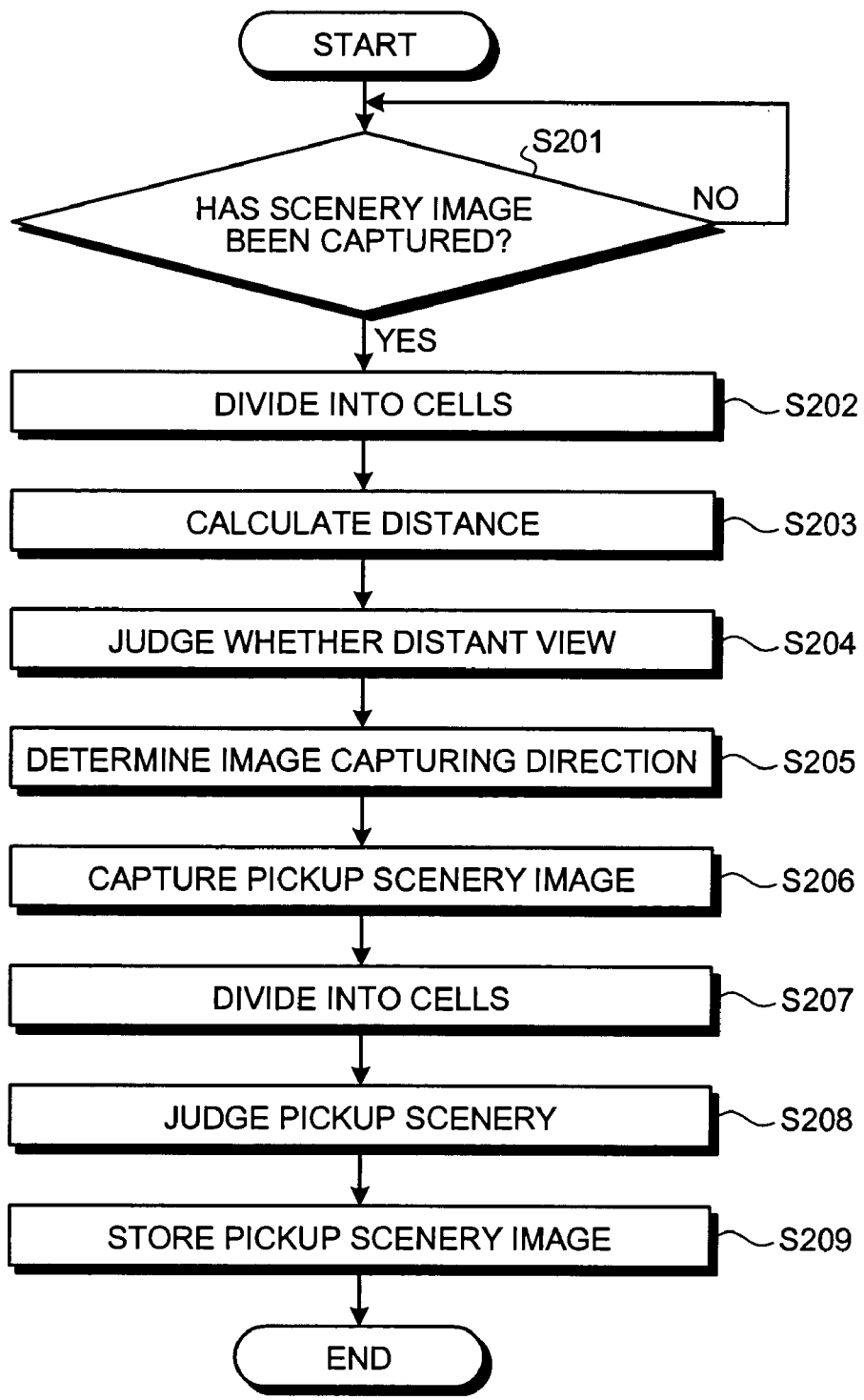
FIG. 2 is a flowchart processing by the scenery imaging apparatus according to the embodiment.

Details of processing by the scenery imaging apparatus 100 according to the embodiment will be described with reference to FIG. 2. FIG. 2 is a flowchart the processing by the scenery imaging apparatus according to the embodiment. As depicted in the flowchart of FIG. 2, the image capturing unit 101 determines whether a scenery image has been captured (step S201). Configuration may be such that scenery images are captured in series as a user or the scenery imaging apparatus 100 travels or are captured upon input for initiation from the user.

Waiting for a scenery image to be captured occurs at step S201, if an image is captured (step S201: YES), the dividing unit 102 divides the scenery image captured at step S201 (hereinafter, "initial scenery image") into plural cells (step S202).

With respect to the initial scenery corresponding to the initial scenery image, the calculating unit 103 calculates distances to portions of the initial scenery corresponding to the cells generated from the division at step S202 (step S203).

The judging unit 105 uses the distances calculated at step S203 to make a judgment concerning distant views (step S204). The judgment concerning distant views involves judging whether portions of the initial scenery respectively corresponding to the cells are distant views, for example.

The determining unit 104 determines the image capturing direction based on a numerical quantity of cells judged at step S204 to correspond to portions of the initial scenery that are distant views in an image area consisting of one or more cells in the initial scenery image (step S205).

The image capturing unit 101 captures a pickup scenery image in the image capturing direction determined at step S205 (step S206). For example, the pickup scenery image is captured by driving a driving unit, not depicted, to turn the on-board camera toward the image capturing direction determined at step S205.

The dividing unit 102 divides the pickup scenery image captured at step S206 into plural cells (step S207).

The judging unit 105 then judges the pickup scenery corresponding to the pickup scenery image captured at step S206 (step S208). For example, the judging unit 105, with respect to the pickup scenery corresponding to the pickup scenery image, judges whether portions of the pickup scenery respectively corresponding to the cells acquired at step S207 correspond to at least one of the sky, the ocean, mountains, and a night view.

The storage unit 106 stores the pickup scenery image depending on the judgment result at step S208 (step S209) and a series of the processing is terminated.

Although not described in the flowchart of FIG. 2, the image capturing direction may be adjusted again by replacing the pickup scenery image captured at step S206 with the initial scenery image of step S201 to execute the subsequent processing.

Although the functions of the scenery imaging apparatus, the scenery imaging method, the scenery imaging program, and the computer-readable recording medium of the present invention are implemented by the scenery imaging apparatus 100 depicted in FIG. 1, configuration is not limited to the scenery imaging apparatus 100, and plural apparatuses may be used having a configuration that includes the functional units depicted in FIG. 1. If the functional units are connected as independent apparatuses, the apparatuses may be connected by performing communication, for example, through Bluetooth (registered trademark), regardless of wired or wireless communication.

As described above, since the scenery imaging apparatus, the scenery imaging method, the scenery imaging program, and the computer-readable recording medium of the present invention judge distant views from the initial scenery image captured and determine the image capturing direction to capture the pickup scenery image, an image of a good view can be captured without preliminary registration.

Since the pickup scenery images captured are stored by judging scenery of the pickup scenery images, the pickup scenery images can be stored appropriately depending on conditions preliminarily defined by a user or factory default setting. In other words, pickup scenery images for scenery captured according to user preferences can be stored efficiently and a storage area can be utilized effectively.

According to the embodiment, a user can automatically capture images of a good view and store appropriate pickup scenery images without operating the scenery imaging apparatus and registering image capturing points. In particular, since the scenery can be checked after driving, a driver has no need to pay attention to the scenery while driving, thereby facilitating safe driving.

Example

An example of the present invention will be described. The example describes a case of implementing the scenery imaging apparatus of the present invention with an on-board apparatus mounted on a mobile object such as a vehicle (including four-wheel vehicles and two-wheel vehicles), for example.
(Hardware Configuration of on-Board Apparatus)

Figure 3:
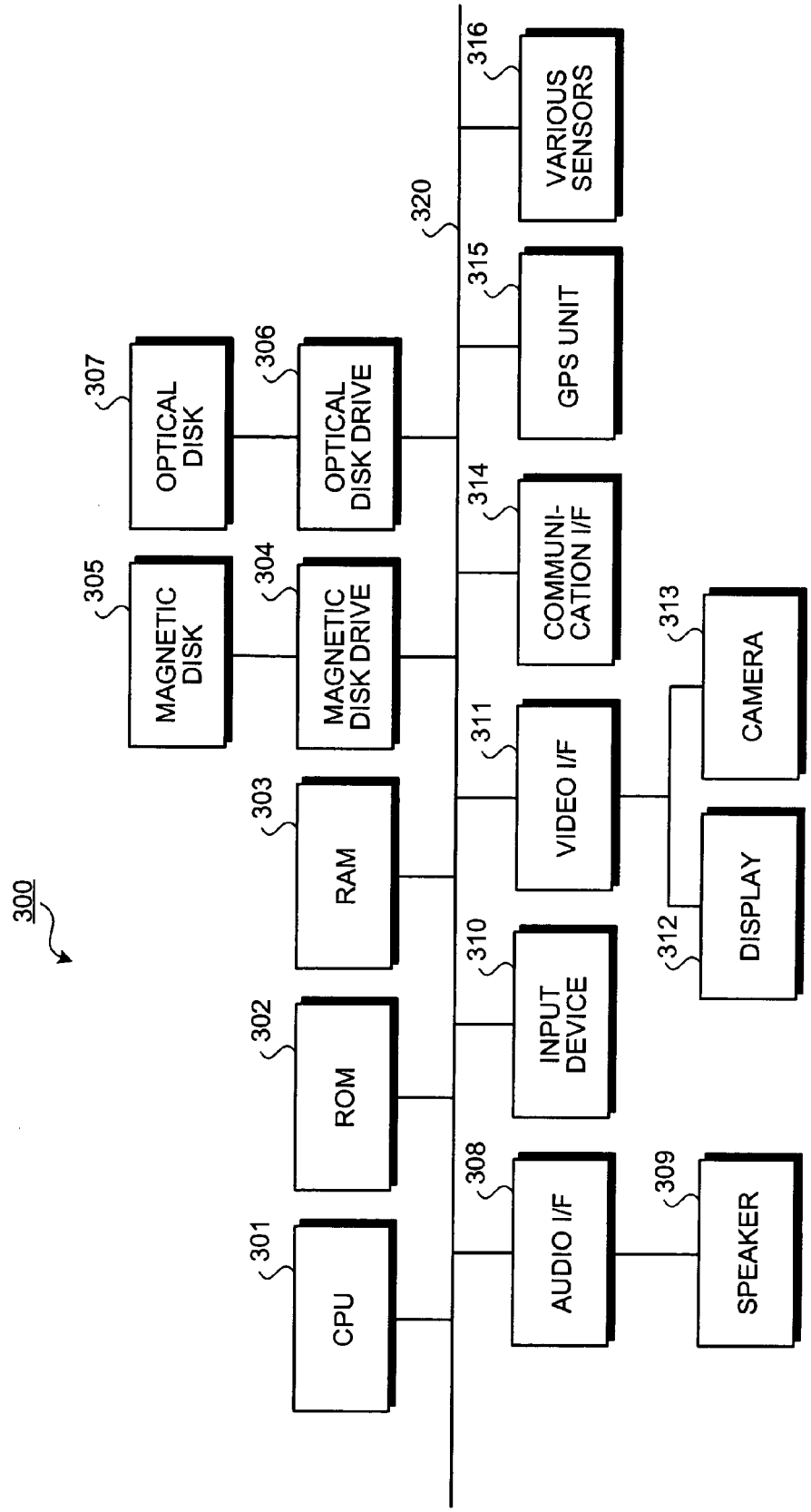
FIG. 3 is a block diagram of an exemplary hardware configuration of an on-board apparatus according to an example.

A hardware configuration of the on-board apparatus according to the example will be described with reference to FIG. 3. FIG. 3 is a block diagram of an exemplary hardware configuration of an on-board apparatus according to the example.

As depicted in FIG. 3, an on-board apparatus 300 is mounted on a mobile object such as a vehicle and includes a CPU 301, a ROM 302, a RAM 303, a magnetic disk drive 304, a magnetic disk 305, an optical disk drive 306, an optical disk 307, an audio I/F (interface) 308, a speaker 309, an input device 310, a video I/F 311, a display 312, a camera 313, a communication I/F 314, a GPS unit 315, and various sensors 316, respectively connected through a bus 320.

The CPU 301 governs overall control of the on-board apparatus 300. The ROM 302 stores therein various programs such as a boot program, an image capturing program, an image judging program, and an image storage program. The RAM 303 is used as a work area of the CPU 301.

The image capturing program causes the camera 313 described hereinafter to capture a scenery image in front of the vehicle, for example. The image capturing program may cause a drive angle to be determined for driving a driving unit of the camera 313 to capture an image in the image capturing direction toward a good view point judged by the judging program described hereinafter and may drive the driving unit to capture a scenery image in the image capturing direction.

The image judging program causes judgments to be made concerning the scenery of the scenery image captured by the camera 313 described hereinafter, for example. Although details are described with reference to FIGS. 4 to 8, the image judging program causes judgments to be made concerning whether the scenery corresponding to a cell making up a portion of the scenery image is a distant view and whether the scenery corresponding to a cell making up a portion of the scenery image corresponds to any one of the sky, the ocean, mountains, and a night view, for example.

The image judging program may cause judgments to be made concerning a direction of a good view for the scenery corresponding to the scenery image based on a numerical quantity of distant-view cells in an image area consisting of plural cells and whether a view is good by causing calculations to be performed for a good-view index depending on the type of scenery corresponding to cells making up a portion of the scenery image, for example.

The image storage program controls the magnetic disk drive 304 or the optical disk drive 306 described hereinafter to store scenery images on a recording medium such as the magnetic disk 305 or the optical disk 307, for example. Specifically, for example, the stored data are scenery images judged to be a good view by the judging program. Since good views are stored in this way, a user can acquire scenery images without being distracted by scenery on the right and/or the left while driving.

The magnetic disk drive 304 controls the reading and writing of data with respect to the magnetic disk 305 under the control of the CPU 301. The magnetic disk 305 records the data written under the control of the magnetic disk drive 304. The magnetic disk 305 may be HD (hard disk) or FD (flexible disk), for example.

Information recorded on the magnetic disk 305 may be scenery images, for example. Although the scenery images are recorded on the magnetic disk 305, the images may be recorded on the optical disk 307 described hereinafter.

The scenery images are recorded not only onto recording media integrally provided with the hardware of the on-board apparatus 300 but also onto recording media provided external to the on-board apparatus 300. In such a case, the on-board apparatus 300 may output the scenery images through the communication I/F 314 over a network, for example.

The optical disk drive 306 controls the reading and writing of data with respect to the optical disk 307 under the control of the CPU 301. The optical disk 307 is a removable recording medium having data read out under the control of the optical disk drive 306. A writable recording medium may be utilized for the optical disk 307. The removable recording medium may be a medium other than the optical disk 307, such as an MO and a memory card.

The audio I/F 308 is connected to the speaker 309 for audio output and the speaker 309 outputs sound.

The input device 310 includes a remote controller having keys for entering characters, numeric values, and various instructions; a keyboard; a mouse; a touch panel; etc.

The video I/F 311 is connected to the display 312 and the camera 313. Specifically, the video I/F 311 includes, for example, a graphic controller that generally controls the display 312, a buffer memory such as VRAM (Video RAM) that temporarily records immediately displayable image information, and a control IC that controls the display 312 based on image data output from a graphic controller.

The display 312 displays icons, cursors, menus, windows, and/or various data such as characters and images. For example, a CRT, a TFT liquid crystal display, a plasma display, etc., may be employed as the display 312. The display 312 may be disposed in plural in a vehicle in such a way that one is for a driver and another for passengers sitting in the backseat, for example.

The camera 313 is disposed on the dashboard or ceiling of the vehicle to capture scenery images outside the vehicle. The scenery images may be still images or moving images and, for example, the camera 313 may capture scenery images in front of the vehicle or in the determined image capturing direction and the scenery images captured may be output to a recording medium such as the magnetic disk 305 and the optical disk 307 by the storage program based on a judgment result by the image judging program. The camera 313 may be a movable camera 313 capable capturing images in the determined image capturing direction by driving the driving unit.

The communication I/F 314 is wirelessly connected to a network and functions as an interface between the on-board apparatus 300 and the CPU 301. The communication I/F 314 is wirelessly connected to a communication network such as the internet and also functions as an interface between the communication network and the CPU 301.

The communication network includes LAN, WAN, public line networks, portable telephone networks, etc. Specifically, the communication I/F 314 includes, for example, an FM tuner, VICS (Vehicle Information and Communication System)/beacon receiver, a radio navigation device, and other navigation devices, and acquires road traffic information, such as information concerning road congestion and traffic regulations, distributed from VICS centers. VICS is a registered trademark.

The GPS unit 315 receives signals from GPS satellites and outputs information indicative of the current position of the vehicle. The information output from the GPS unit 315 is used along with output values of the various sensors 316 described hereinafter when the CPU 301 calculates the current position of the vehicle. The information indicative of the current position is information specifying one point on map information, for example, latitude/longitude and altitude and may be correlated with the scenery images to be stored to check the points of the good-view scenery images.

The various sensors 316 include a speed sensor, an acceleration sensor, and an angular-speed sensor and the values output from the various sensors 316 are used by the CPU 301 for calculating the current position of the vehicle and measuring changes in velocity and direction.

The functions of the image capturing unit 101, the dividing unit 102, the calculating unit 103, the determining unit 104, the judging unit 105, and the storage unit 106 included in the scenery imaging apparatus 100 depicted in FIG. 1 are implemented with the use of programs and data recorded on the ROM 302, the RAM 303, the magnetic disk 305, the optical disk 307, etc., of the on-board apparatus 300 depicted in FIG. 3 and by causing the CPU 301 execute predetermined programs to control the constituent units of the on-board apparatus 300.

The on-board apparatus 300 of the example may execute the various programs recorded on the ROM 302 serving as the recording medium in the on-board apparatus 300 to implement the functions of the scenery imaging apparatus 100 depicted in FIG. 1 according to the procedure depicted in FIG. 2.

(Schematic of Processing by the on-Board Apparatus 300)

A schematic of processing by the on-board apparatus 300 according to the example will be described with reference to FIGS. 4 to 8. The on-board apparatus 300 according to the example includes, for example, the movable camera 313 disposed at or in proximity to the dashboard of the vehicle to capture a scenery image in front of the vehicle and performs various judgments (analyses). The scenery image in front is captured because remote scenery (distant views) is generally located in front or in front diagonally toward the right or the left as positions of good views.

The scenery image in front of the vehicle is analyzed to judge whether remote scenery is included in the scenery image, and if remote scenery is included, the camera 313 is driven toward the camera 313 drive direction, which is a direction of the remote scenery. A scenery image is captured and the good-view index is calculated. Although details are described with reference to FIG. 8, for example, the scenery image may be divided into plural cells and the good-view index may be represented by the number of cells judged to be remote scenery. If the good-view index is high, passengers are notified, and the scenery image and the position information concerning the scenery image are correlated and stored.

Figure 4:
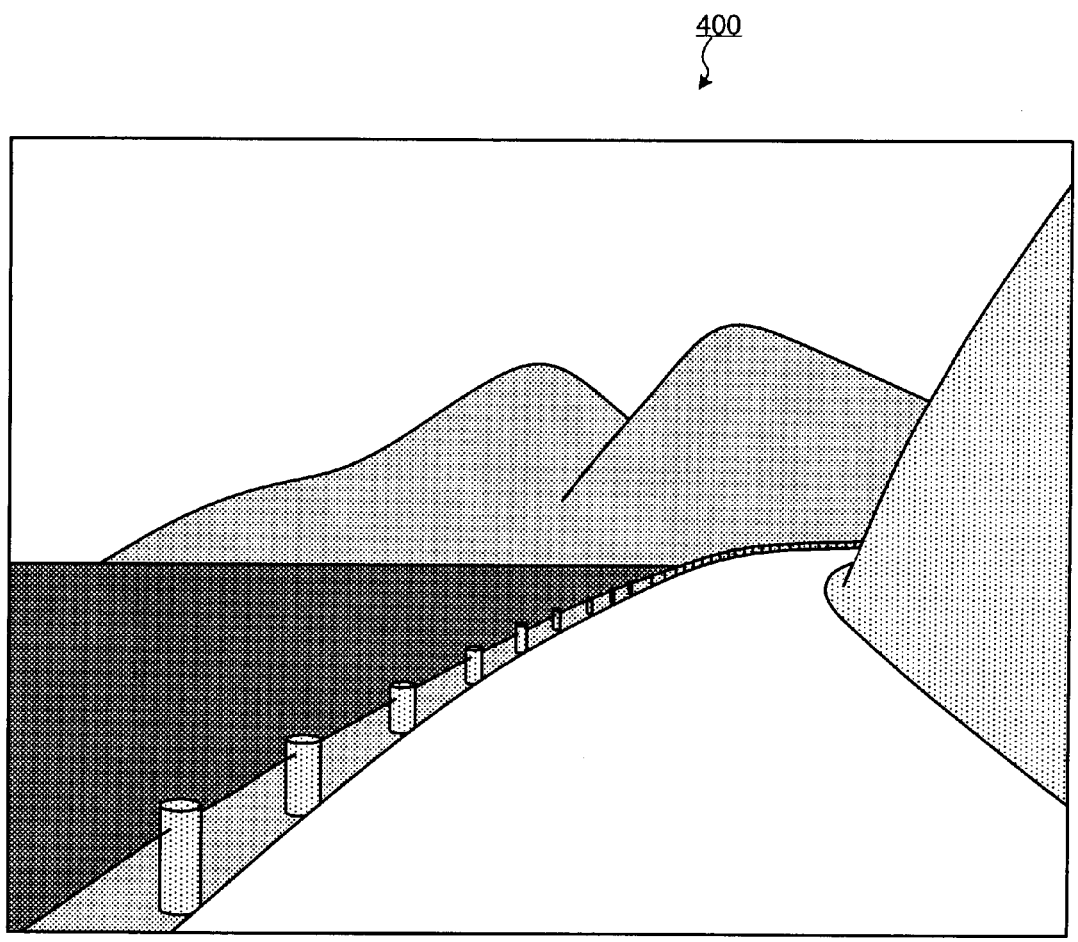
FIG. 4 is a diagram of an exemplary scenery image according to the example.

FIG. 4 is a diagram of an exemplary scenery image according to the example. As depicted in FIG. 4, a scenery image 400 represents scenery in front of the vehicle and is captured by the camera 313 disposed on the vehicle. The scenery image 400 may be captured in succession if the vehicle is moving or may be captured one frame at a time at predetermined intervals. The scenery image 400 captured is output to, for example, a buffer area of the video I/F 311 or a work area of another recording medium.

The CPU 301 may determine whether the captured scenery image 400 has been properly captured. Specifically, for example, the CPU 301 may determine through image recognition whether an obstacle is included in the scenery image. If the image of the scenery has not been properly captured, the scenery image 400 may be discarded.

Figure 5:
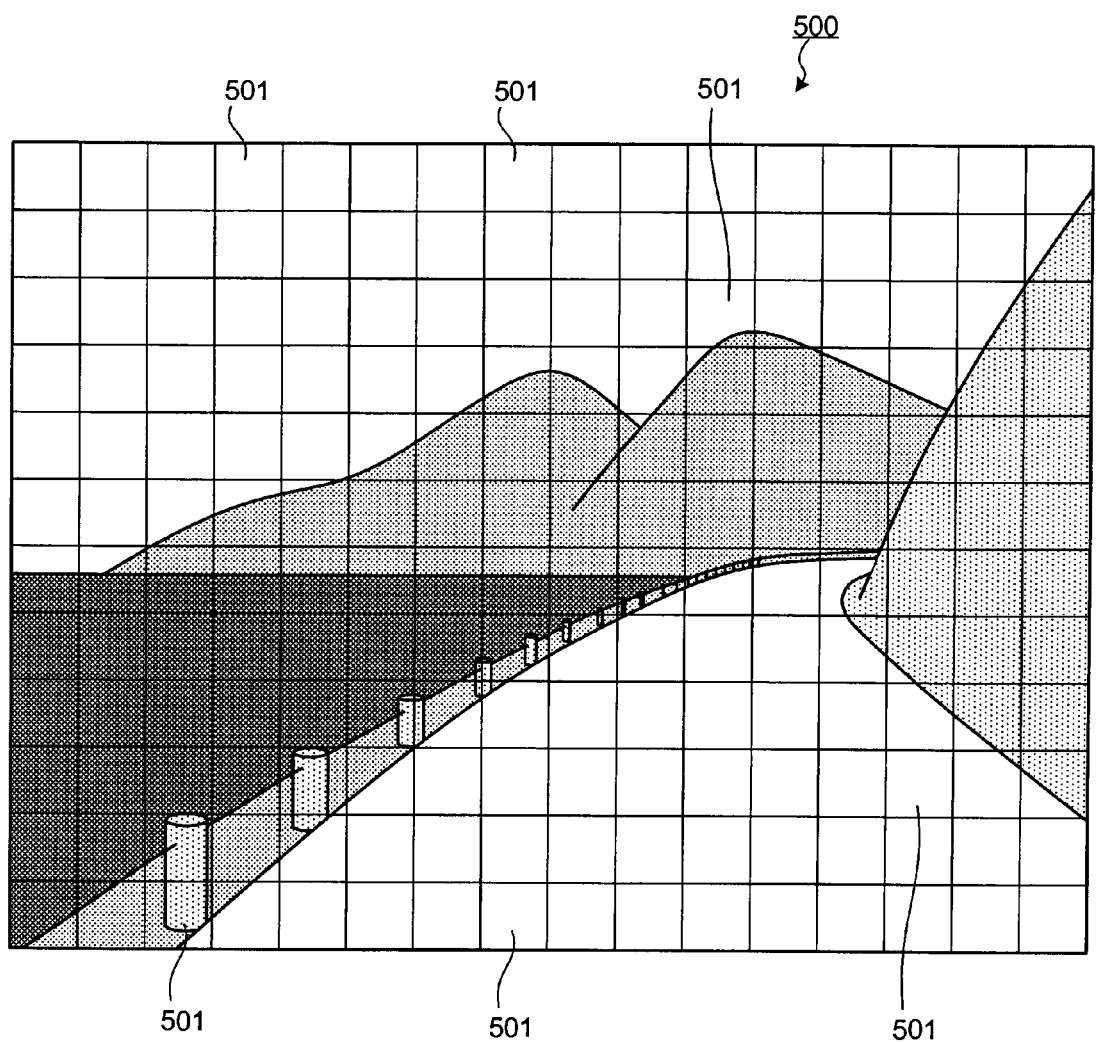
FIG. 5 is a diagram depicting an example of a division of the scenery image according to the example.

FIG. 5 is a diagram depicting an example of a division of the scenery image according to the example. As depicted in FIG. 5, a scenery image 500 is made up of plural divided cells 501, 501, . . . of the scenery image 400 depicted in FIG. 4.

Specifically, for example, the division into the cells 501 is performed by the CPU 301 dividing the scenery image 400 recorded in the buffer area of the video I/F 311 or a work area of another recording medium into the cells 501. For example, if the scenery image 400 has a size of 1280×1024 pixels, the size of the cells 501 is desirably set at approximately 30×30 pixels. The size of the cells 501 may be determined with consideration of the precision and processing speeds for the calculation of distances and the judgment concerning scenery described hereinafter.

If the entire scenery image 400 cannot be divided into uniform cells due to a relation between the sizes of the scenery image 400 to be divided and the cells 501, the edges of the scenery image 400 may be excluded from the portion to be divided.

Figure 6:
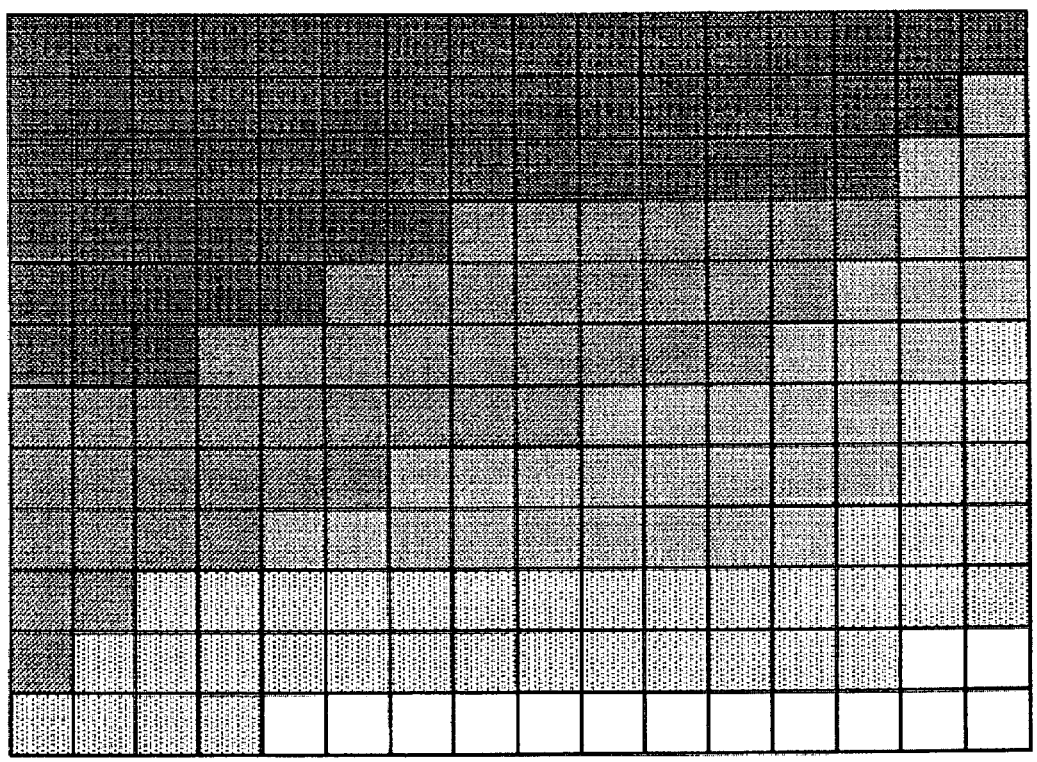
FIG. 6 is a diagram for explaining one example of a calculation of distance and judgment of distant view with respect to cells in the scenery image according to the example.

FIG. 6 is a diagram for explaining one example of a calculation of distance and judgment of distant view with respect to the cells in the scenery image according to the example. As depicted in FIG. 6, an image 600 represents a result after calculating distances and making judgments concerning a distant view with respect to the cells 501 making up the scenery image 500 depicted in FIG. 5.

Specifically, for example, when a distance is calculated, first, an attribute point is detected for each cell from two scenery images captured in temporal succession. In other words, an attribute point is detected as a point (i.e., pixel) conforming to a condition defined in advance, from a portion of the scenery included in cells, for two consecutive scenery images in time series. One or more attribute points may be detected for each cell, for example.

Optical flow is then calculated from the detected attribute points. The optical flow is calculated by obtaining a change (motion vector) in the attribute point detected for each cell, for two scenery images captured sequentially. An average distance of each cell is detected. In other words, vectors (optical flows) corresponding to the respective attribute points detected for the cells are used to calculate distances between the camera 313 and the attribute points, and the calculated distances are averaged to calculate average distances of the cells. Since relative differences between the cells only need to be recognized from the average distance, for example, the sky is processed as an infinite distance in this example.

If a compound eye camera 313 is used for the camera 313, the average distance of each cell may be calculated from the deviation of the parallax for two scenery images captured concurrently from different positions.

Specifically, for example, the judgment of a distant view is a process of judging whether a portion of the scenery included in each cell is a distant view based on the average distance of each cell calculated from the above distance calculations.

More specifically, for example, the judgment of a distant view is performed by judging that a portion of the scenery corresponding to the cell is a distant view (e.g., scenery at a long distance such as the sky, the ocean, and mountain) if the average distance calculated for the cell is greater than a preset threshold value and that a portion of the scenery corresponding to the cell is a close view (e.g., scenery at a short distance such as a road on which the vehicle travels and a vehicle travelling ahead) if the average distance calculated for the cell is smaller than the preset threshold value.

Plural threshold values may be set preliminarily, and the image 600 represents a result of the judgment of distant view based on plural distances. Specifically, for example, the cells are represented by steps such as white, gray, and black, where lighter colors (closer to white) represent closer views (shorter average distances) and darker colors (closer to black) represent more distant views (longer average distances).

Figure 7:
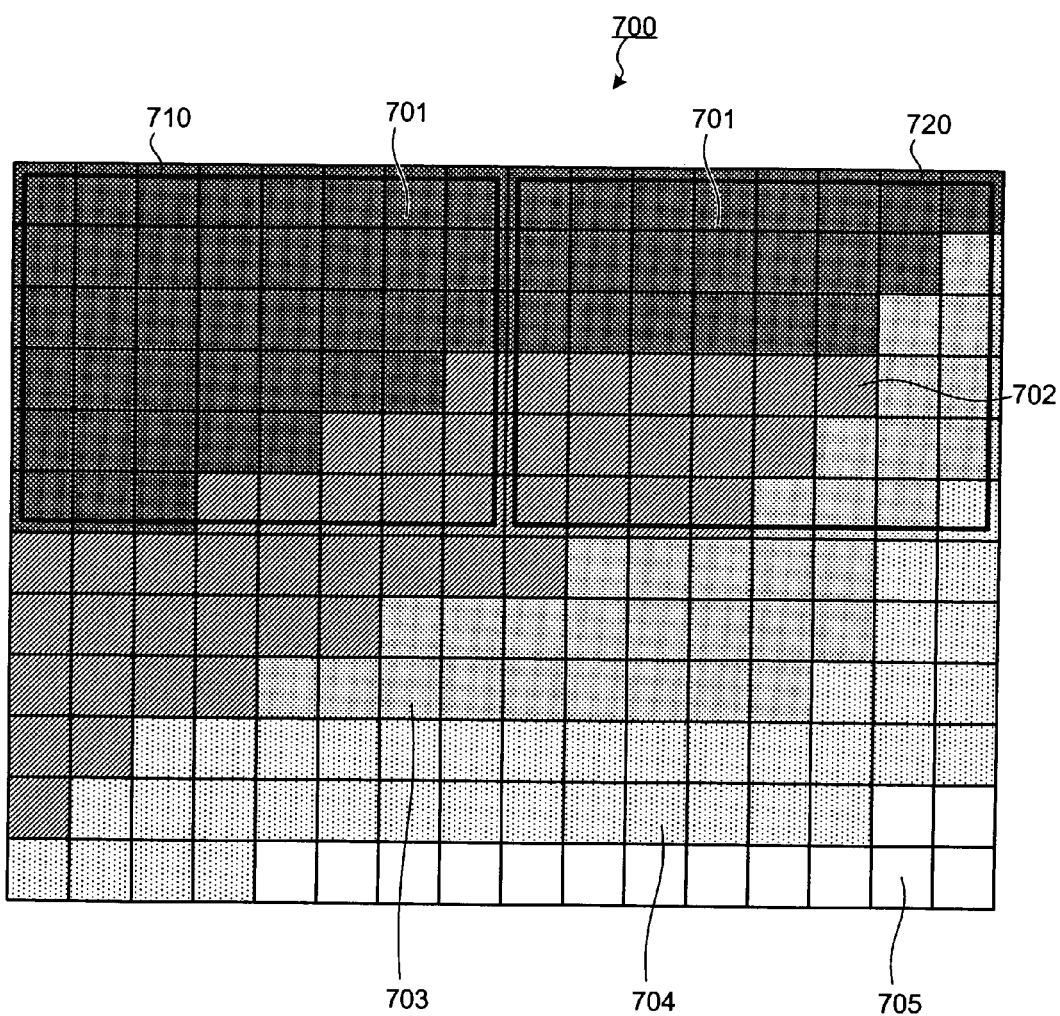
FIG. 7 is a diagram for explaining determination of a drive angle of a camera according to the example.

FIG. 7 is a diagram for explaining determination of a drive angle of the camera according to the example. As depicted in FIG. 7, an image 700 is made up of cells 701, 702, 703, 704, and 705 from the multistep judgment of a distant view depicted in FIG. 6. In the description of FIG. 7, five steps of distant view are judged in the multistep judgment of a distant view, and the cells are separated by colors from a dark color to a light color in the order from the black cells 701 representing the most distant view and the cells 705 of the closest view are represented by white.

A left area 710 and a right area 720 consisting of the cells 701 (702, 703, and 704) in plural are set in the image 700, and the drive angle of the camera 313 is configured to be determined based on a numerical quantity of the cells 701 having the most distant view included in the left area 710 and the right area 720.

More specifically, for example, the determination of the drive angle may involve determining the drive angle by driving the camera 313 by a certain angle toward the left area 710 or the right area 720 having the greater numerical quantity of the cells 701 having the most distant view. Since the numerical quantity of the cells 701 having the most distant view is 39 in the left area 710 and the numerical quantity of the cells 701 having the most distant view is 21 in the right area 720 in the image 700, the camera 313 is driven toward the left by a certain angle.

The camera 313 may be turned toward an area including a predetermined numerical quantity, or more, of the cells 701 having the most distant view. Specifically, for example, if a numerical quantity of the cells 701 having the most distant view is 30, or more, this may be used for a direction of good scenery to determine the drive angle. This enables a precise judgment to be made concerning the direction of a good view instead of merely comparing the left and right areas 710, 720.

The angle may be calculated depending on a difference between the left and right areas 710, 720. Specifically, for example, the angle may be increased as the difference increases and may be reduced as the difference decreases. The five steps of the distant view may be converted into points and the points may be counted. Specifically, for example, the cell 701, the cell 702, the cell 703, the cell 704, and the cell 705 may be given one point, two points, three points, four points, and five points, respectively, and the direction of a good view may be set to an area having a smaller sum of points.

The areas are not limited to the size in the image 700 and three or more areas may exist in addition to the left and right areas 710, 720 in such way that an area is provided in the middle. Alternatively, a road vanishing point may be detected in the vertical direction and the drive angle may be determined for the area located above the road vanishing point. Adjusting the area to be judged in this way may accelerate the process and alleviate the load thereof.

Figure 8:
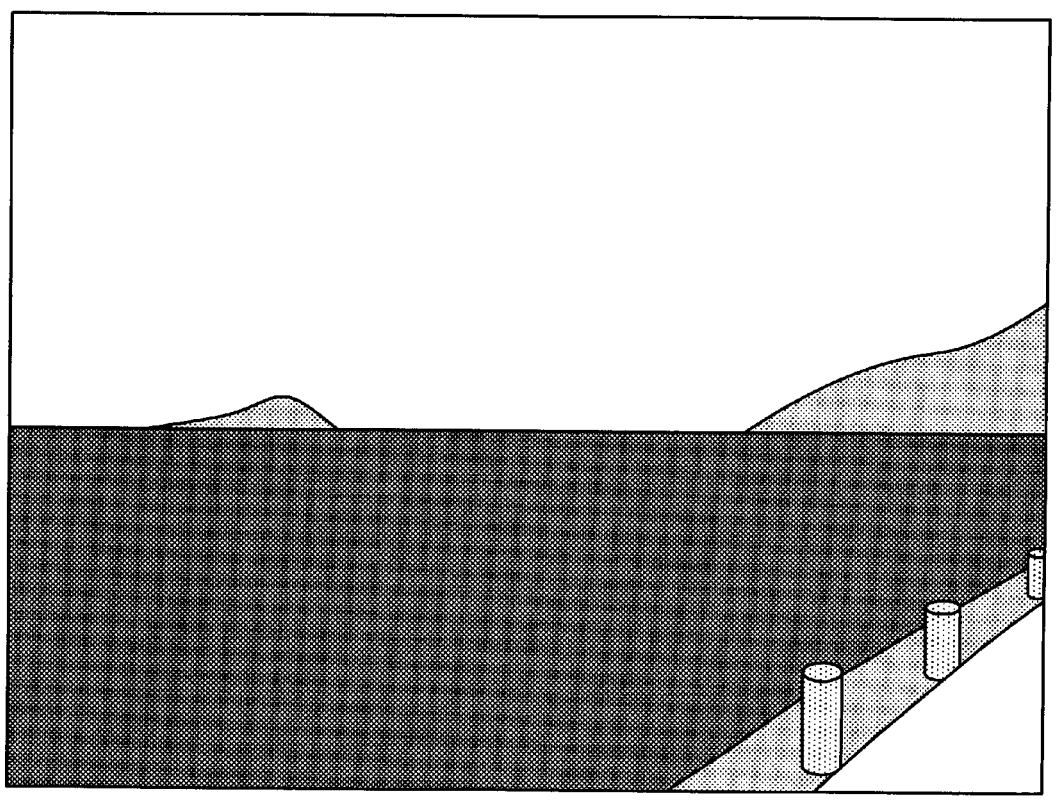
FIG. 8 is a schematic for explaining a good-view index according to the example.

FIG. 8 is a schematic for explaining the good-view index according to the example. As depicted in FIG. 8, a scenery image 800 is a scene captured after driving the camera 313 to the drive angle of the camera 313 determined based on the numerical quantity of the cells 701 with the most distant view depicted in FIG. 7. The scenery image 800 captured is output to, for example, a buffer area of the video I/F 311 or a work area of another recording medium.

The good-view index is calculated through image analysis of the scenery image 800. Specifically, for example, the good-view index may be calculated from rates of the ocean and the sky or may be calculated by dividing the scenery image 800 into plural cells and counting the number of cells of the ocean and of the sky. The judgment concerning the ocean and the sky will be described with reference to FIGS. 12 and 13. The division into cells is substantially identical to that described with reference to FIG. 5 and, therefore, will not be described.

If the calculated good-view index is equal to or more than a certain value, the scenery image 800 is judged to be scenery with a good view; passengers are notified; and the scenery image and the position information concerning the scenery image are correlated and stored. The display 312, etc., may indicate the direction of the good view or display the scenery in the direction of the good view.

(Details of Processing by the on-Board Apparatus 300)

Figure 9:
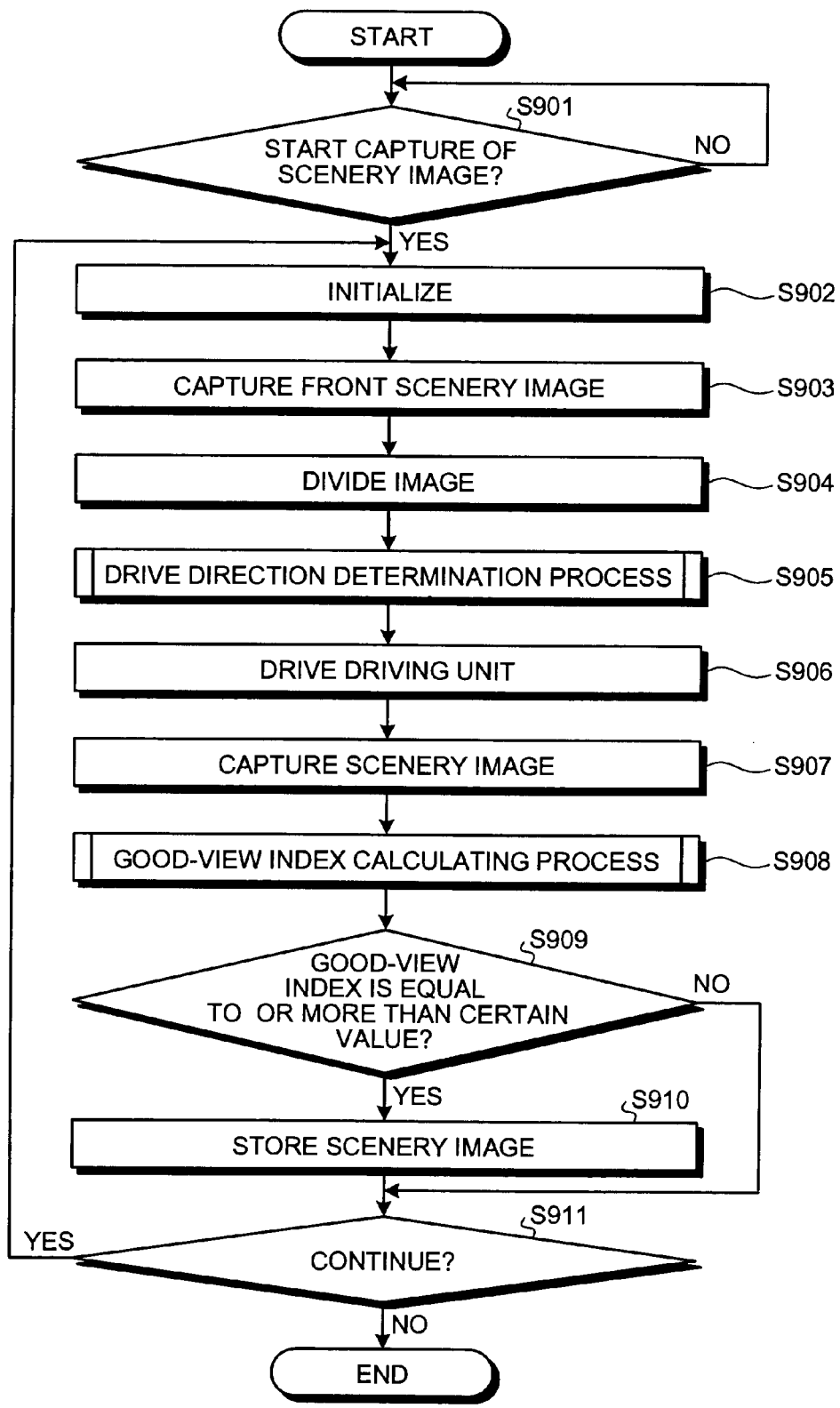
FIG. 9 is a flowchart of processing by the on-board apparatus according to the example.

Details of processing by the on-board apparatus 300 according to the example will be described with reference to FIGS. 9 to 13. FIG. 9 is a flowchart of processing by the on-board apparatus according to the example. As depicted in the flowchart of FIG. 9, it is determined whether the camera 313 is to start capturing scenery images (step S901). The capturing of images may start when the vehicle moves or upon receipt of input for the start from the user.

At step S901, waiting occurs until the capturing of images is to start. When the capturing is to start (step S901: YES), the CPU 301 initializes the camera 313 (step S902). The initialization may be performed by turning the movable camera 313 forward, for example.

The camera 313 then captures a scenery image in front of the vehicle (step S903). Specifically, for example, the scenery image 400 depicted in FIG. 4 is captured and output to a buffer memory of the video I/F 311 or a work area of another recording medium.

The CPU 301 divides the scenery image captured at step S903 (step S904). Specifically, for example, the division of the image is performed by dividing the scenery image 400 into the cells 501 to form the scenery image 500 consisting of the cells 501, as depicted in FIG. 5.

The CPU 301 uses the scenery image subjected to the division of the image at step S904 to execute a drive direction determining processing to drive the camera 313. The drive direction determining processing may be performed based on, for example, the judgment concerning the distant view with respect to the cells generated from the division at step S904. Details of the drive direction determining processing will be described hereinafter with reference to FIG. 10.

The CPU 301 then drives the driving unit of the camera 313 to the drive angle determined by the drive direction determining processing at step S905 (step S906).

The camera 313 subsequently captures a scenery image in the drive direction of step S906 (step S907).

The CPU 301 executes good-view index calculation processing with respect to the scenery image captured at step S907 (step S908). The good-view index calculation processing may calculate the index from rates of the ocean and the sky in the scenery image 800 depicted in FIG. 8, for example. Details of the good-view index calculation processing will be described hereinafter with reference to FIG. 11.

The CPU 301 determines whether the good-view index calculated by the good-view index calculation processing at step S908 is at least equal to a certain value (step S909). The certain value for judging the good-view index may be set by a user or may change automatically depending on weather, etc.

If the good-view index is at least equal to a certain value at step S909 (step S909: YES), the scenery image captured at step S907 is stored, as scenery with a good view, onto the recording medium such as the magnetic disk 305 and the optical disk 307 (S910). The storage of the scenery image may be performed by correlating and storing the scenery image and position information concerning the scenery image and, the passengers may be notified of the storage. The notification to the passengers may be performed by indicating the direction of the good view or displaying the scenery in the direction of the good view.

If the good-view index is less than the certain value at step S909 (step S909: NO), the processing proceeds to step S911.

The CPU 301 then determines whether the capturing of scenery images is to be continued (step S911). For example, the continuation may be determined if the vehicle is moving or may be determined by the receipt of instruction for continuation from a user.

If the capturing of images is to be continued at step S911 (step S911: YES), processing returns to step S902 and if the capturing is not to be continued (step S911: NO), a series of the processing is terminated.

Although not described in the flowchart depicted in FIG. 9, if the notification to passengers is configured to be output to, for example, a car navigation apparatus mounted on the vehicle, the point with a good view may be registered into the car navigation apparatus and may be utilized by the passengers as a recommended stop point. If the vehicle can be stopped, the passengers may stop the vehicle to stroll around the point with a good view. The car navigation apparatus may be configured to retrieve possible parking points such as parking areas or parks through a peripheral search to guide the vehicle.

Figure 10:
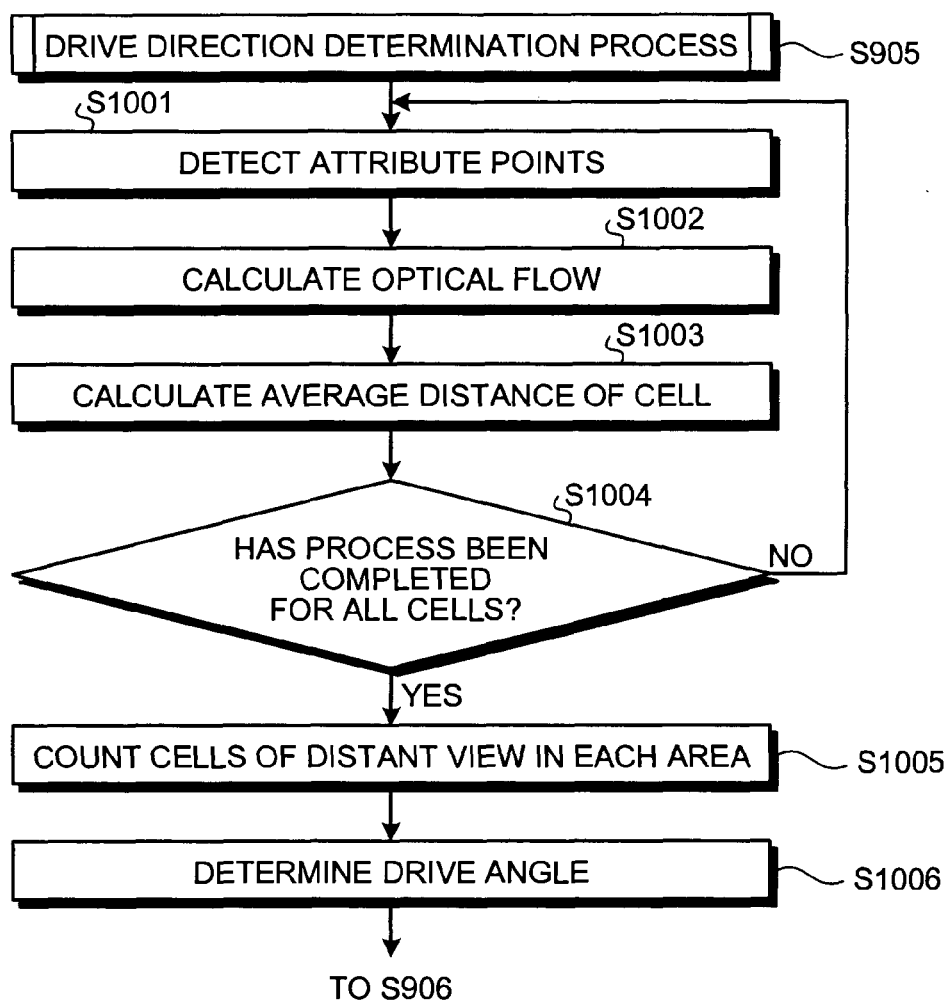
FIG. 10 is a flowchart of drive direction determining processing (step S905 of FIG. 9) by the on-board apparatus according to the example.

The drive direction determining processing (step S905 of FIG. 9) by the on-board apparatus 300 according to the example will be described with reference to FIG. 10. FIG. 10 is a flowchart of drive direction determining processing (step S905 of FIG. 9) by the on-board apparatus according to the example. As depicted in the flowchart of FIG. 10, the CPU 301 detects an attribute point for each cell generated from the division at step S904 (step S1001).

The CPU 301 calculates the optical flow from the attribute points detected at step S1001 (step S1002) and uses the optical flow to calculate the average distance for each cell (step S1003). If the camera 313 is a compound eye camera, the average distance of each cell may be calculated from the deviation of the parallax for two scenery images captured concurrently from different positions at step S1003 instead of using the optical flow to calculate the average distance.

The CPU 301 determines whether the processing has been completed for all the cells (step S1004).

If the processing has not been completed for all the cells (step S1004: NO), the processing is repeated from step S1001, and if the processing has been completed for all the cells (step S1004: YES), the CPU 301 counts the cells of a distant view in each area (step S1005). The areas may be, for example, the left area 710 and the right area 720 depicted in FIG. 7 and a numerical quantity of the cells 701 having the most distant view may be counted for each area.

The CPU 301 determines the drive angle for driving the camera 313 based on the numerical quantity of the cells 701 having a distant view counted at step S1005 (step S1006). The drive direction determining processing at step S905 depicted in FIG. 9 is terminated and the processing proceeds to step S906.

Figure 11:
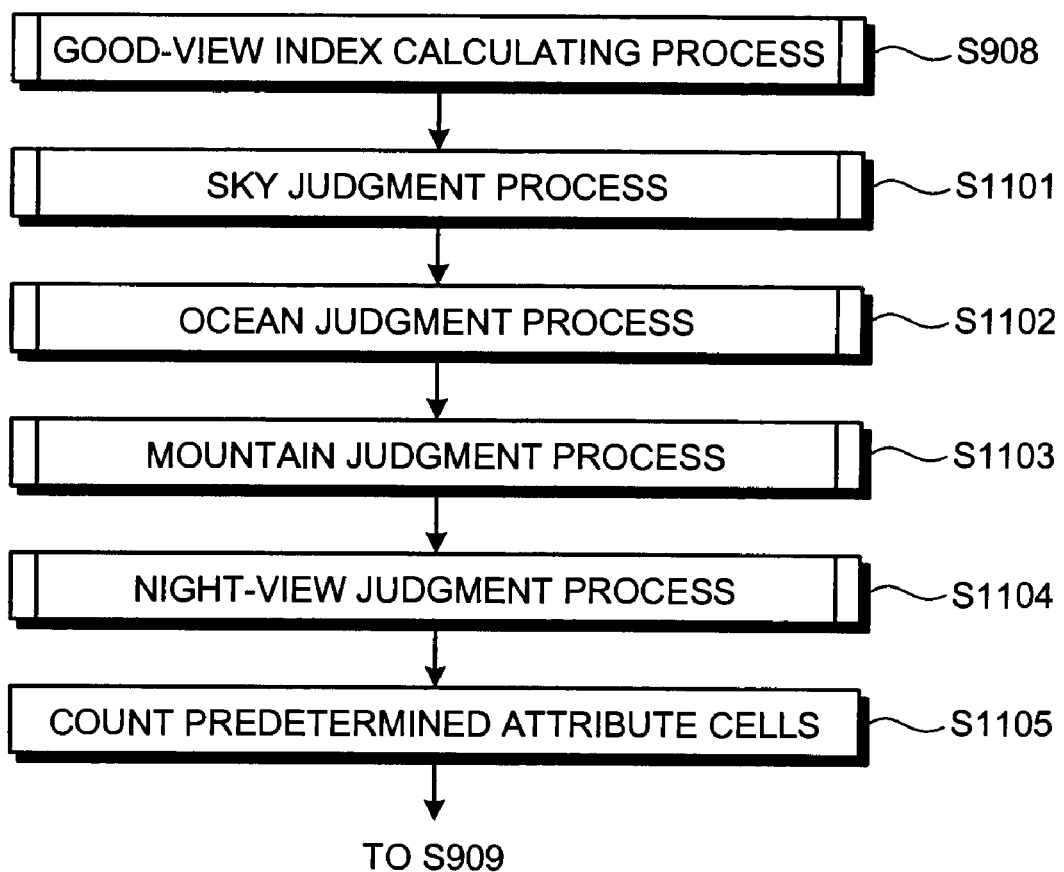
FIG. 11 is a flowchart good-view index calculation processing (step S908 of FIG. 9) by the on-board apparatus according to the example.

The good-view index calculation processing (step S908 of FIG. 9) by the on-board apparatus 300 according to the example will be described with reference to FIG. 11. FIG. 11 is a flowchart good-view index calculation processing (step S908 of FIG. 9) by the on-board apparatus according to the example. As depicted in the flowchart of FIG. 11, the CPU 301 executes sky judgment processing with respect to the scenery image captured at step S907 (step S1101). The sky judgment processing may be executed, for example, by judging whether a portion of the scenery is the sky from variances of brightness of pixels included in the cells located on the upper side. Details of the sky judgment processing will be described hereinafter with reference to FIG. 12.

The CPU 301 subsequently executes ocean judgment processing with respect to the scenery image captured at step S907 (step S1102). The ocean judgment processing may be executed, for example, by judging with respect a cell judged not to be the sky, whether a portion of the scenery is the ocean based on the average hue and the average saturation of the pixels included in a cell judged to be the sky. Details of the ocean judgment processing will be described hereinafter with reference to FIG. 13.

The CPU 301 then executes mountain judgment processing with respect to the scenery image captured at step S907 (step S1103). The mountain judgment processing may be executed, for example, by judging whether the scenery includes a mountain by detecting a boundary between the sky and scenery that is not the sky through an analysis of color properties for each of the cells that are adjacent to the cells judged to be the sky and among the cells judged not to be the sky at step S1101.

The CPU 301 executes night-view judgment processing with respect to the scenery image captured at step S907 (step S1104). The night-view judgment processing is executed, for example, by judging with respect to each of the cells, whether a portion of the scenery is a night view based on the number of pixel groups distinguished as exceeding a reference, among pixel groups distinguished by a binarization of pixels using a predetermined value of brightness as a reference.

The CPU 301 subsequently counts predetermined attribute cells based on the scenery judged at steps S1101 to 1104 (step S1105). The good-view index calculation processing at step S908 of FIG. 9 is terminated and the processing proceeds to step S909. The counting of the predetermined attribute cells may be performed by counting the numerical quantities of cells of the ocean and of the sky to obtain the good-view index as depicted in FIG. 8 or may be performed according to attribute cell settings preliminarily provided by a user.

Although the good-view index is used as an attribute of scenery in this example, a degree of urbanization, a degree of naturalness, a degree of foliage coloring, etc., may also be used. Specifically, for example, in the case of a degree of foliage coloring, a fractal dimension is analyzed with respect to the scenery image divided into cells to judge green leaves (green), red leaves (red and yellow), and fallen leaves (brown) for each cell. Quantities of the attribute cells are cumulated according to type to obtain ratios of the attribute cells to all the cells in the scenery image according to type, such as a green leaf ratio, a red leaf ratio, and a fallen leaf ratio.

The green leaf ratio, the red leaf ratio, and the fallen leaf ratio may be used to express the degree of foliage coloring by the following equation (1).

$$\text{degree of foliage coloring} = (\text{red leaf ratio} - \text{fallen leaf ratio}) / (\text{green leaf ratio} + \text{red leaf ratio} + \text{fallen leaf ratio}) \quad (1)$$

It may be judged that a degree of foliage coloring 1.0 to 0.5 expressed as above indicates a high season of colored leaves; less than 0.5 to more than 0.0 indicates the start of coloring (fallen leaf ratio=0) or the end of coloring (fallen leaf ratio>0); 0.0 indicates evergreen broad-leaved trees, conifers, preseason of colored leaves (fallen leaf ratio=0), or end of coloring (fallen leaf ratio>0); and less than 0.0 to −1.0 indicates fallen leaves.

Figure 12:
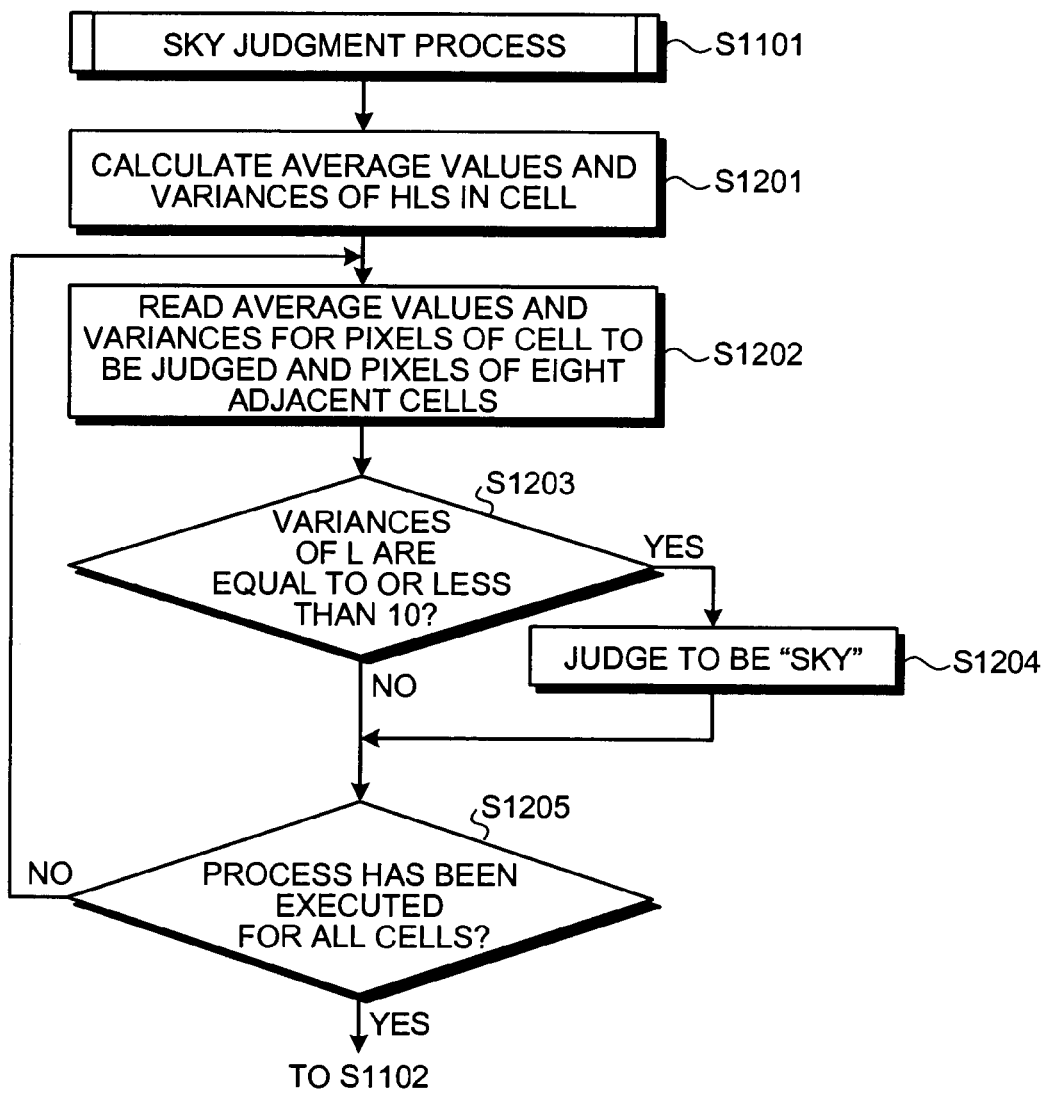
FIG. 12 is a flowchart of sky judgment processing (step S1101 of FIG. 11) by the on-board apparatus according to the example.

Details of the sky judgment processing (step S1101 of FIG. 11) by the on-board apparatus 300 according to the example will be described with reference to FIG. 12. FIG. 12 is a flowchart of sky judgment processing (step S1101 of FIG. 11) by the on-board apparatus according to the example. As depicted in the flowchart of FIG. 12, the CPU 301 calculates average values and variances of HLS in cells from hue H, brightness L, and saturation S of the pixels included in each cell (step S1201). The calculated average values and variances are recorded in the buffer area of the video I/F 311 or a work area of another recording medium, for example.

For the average values and the variances calculated at step S1201, the CPU 301 reads the average values and the variances for the pixels of the cell to be judged including the pixels of the eight adjacent cells thereof (step S1202). A judgment is made by reading the average values and the variances for the pixels of one cell to be judged and for the pixels of eight cells located in the vicinity of the one cell. Cells to be judged may be cells located on the upper side or, typically, the upper half of the scenery image, for example. A series of operations from step S1203 to step S1205 is repeated for each cell to be judged.

If color information corresponding to the cells is color information for the RGB system, this color information may be converted into color information for a color system having parameters of hue, saturation, and brightness, for example, color information for the HLS system.

The CPU 301 determines whether all the variances of the brightness L read at step S1202 are at least equal to 10 for the one cell to be judged and the eight adjacent cells thereof (step S1203).

If all the variances of the brightness L are at least equal to 10 for one cell to be judged and eight adjacent cells thereof (step S1203: YES), the CPU 301 judges that a portion of the scenery included in the one cell to be judged is the "sky" (step S1204); the cell is judged to be a "sky" cell, and the result of the judgment is recorded in the buffer area of the video I/F 311 or a work area of another recording medium, for example.

The CPU 301 determines whether the series of operations from step S1202 to step S1204 has been performed for all the cells that should be judged (step S1205).

If any variance of the brightness L is greater than 10 for the one cell to be judged and the eight adjacent cells thereof at step S1203 (step S1203: NO), the processing goes to step S1205 to determine whether the series of operations from step S1202 to step S1204 has been performed for all the cells that should be judged (step S1205).

At step S1205, if the series of operations from step S1202 to step S1204 has been performed for all the cells that should be judged (step S1205: YES), the sky judgment processing at step S1101 of FIG. 11 is terminated and the processing proceeds to step S1102.

At step S1205, if the series of operations from step S1202 to step S1204 has not been performed for all the cells that should be judged (step S1205: NO), a series of the operations from step S1202 are repeated.

Whether the cells included in the scenery image are "sky" cells is judged through a series of operations from step S1201 to step S1204 as described above. Although not described in FIG. 12, the judgment to determine whether a cell is a "sky" cell may be made with respect to the cells judged to be distant view, among the cells included in the scenery image.

Although not described in FIG. 12, weather conditions may be judged based on the cells judged to be "sky" cells as a part of the sky judgment processing.

The judgment of weather conditions are made for all the cells that should be judged in FIG. 12, for example, and the weather condition for each cell is judged based on average values of the hue H, the brightness L, and the saturation S of the cells judged to be "sky" cells.

More specifically, for example, the average values of the hue H, the brightness L, and the saturation S of a cell judged to be a "sky" cell are used to judge the weather condition by judging whether the average values of the hue H, the brightness L, and the saturation S of the cell to be judged satisfy predefined judgment conditions. For example, "blue sky", "white cloud", "black cloud", "sunset", and "night" may be set as weather conditions for cells.

For example, the judgment conditions may be set as follows. The hue H, the brightness L, and the saturation S are represented in a range of 0 to 255.

The judgment condition for judging the cell to be "blue sky" is defined by an average value of the hue H equal to or more than 100 and less than 160, an average value of the brightness L equal to or more than 100 and less than 180, and an average value of the saturation S equal to or more 60.

The judgment condition for judging the cell to be "white cloud" is defined by an average value of the brightness L equal to or more than 180.

The judgment condition for judging the cell to be "black cloud" is defined by an average value of the brightness L equal to or more 180 and an average value of the saturation S less than 60.

The judgment condition for judging the cell to be "sunset" is defined by an average value of the hue H equal to or more 0 and less than 50, or equal to or more than 220 and equal to or less than 250, an average value of the brightness L less than 180, and an average value of the saturation S equal to or more than 60.

The judgment condition for judging the cell to be "night" is defined by an average value of the brightness L less than 100.

After the weather condition is judged for each cell based on the above judgment conditions, the numerical quantities of the cells of the respective weather conditions are counted. The numbers of cells are respectively counted for the cells judged to be "blue sky", the cells judged to be "white cloud", the cells judged to be "block cloud", the cells judged to be "sunset", and the cells judged to be "night".

The weather condition of the scenery image is judged based on the numerical quantities counted. Specifically, for example, the judgment of the weather condition may be performed by judging that the weather condition of the scenery image is the weather condition having the largest number of cells among the numbers of cells of the respective weather conditions. More specifically, for example, if the number of cells judged to be "blue sky" is greater than the number of cells judged to be any other weather condition such as "white cloud", "block cloud", "sunset", and "night", the weather condition of the scenery image is judged to be "blue sky".

Although cells to be judged are fixed as the cells on the upper side (typically, upper half) of the scenery image in the sky judgment processing depicted in FIG. 12, the area of cells to be judged may be variable.

Specifically, for example, the cells to be judged in the sky judgment processing may be cells located above the horizon in the scenery image. In this case, for example, the road vanishing point may be detected in the scenery image and the position of the horizon is identified based on the vanishing point. In this case, an intersecting point can be detected by an extension of lines (e.g., white lines) along both edges of the road and may be used as the vanishing point.

By determining the areas of cells to be judged as described above, the sky judgment processing can be executed with higher accuracy even when the position of the horizon in the captured scenery images moves upward or downward due to the orientation of the mounting of the camera 313 and/or vertical motion of the mobile object.

Alternatively, a G-sensor (or acceleration sensor) sensing the tilt of the camera 313 may be used to detect the horizon in the scenery image and the sky judgment processing may be executed for the cells located above the horizon. In this case, the sky judgment processing can be executed with higher accuracy as well.

For each cell in the sky judgment processing depicted in FIG. 12, cloud shape may be judged based on the judgment result of the weather condition. To judge cloud shape, a boundary is detected between the cells judged to be "blue sky" or "sunset" and the cells judged to be "white cloud" or "black cloud" adjacent to each other. For example, if a boundary vertically extends in the scenery image between clusters of "white cloud" cells and "blue sky" cells adjacent to each other, this can be judged to be "cumulonimbus cloud (or long cloud)". Alternatively, when boundaries of "white cloud" cells and "blue sky" cells adjacent to each other are spotty or wavy in the scenery image, this can be judged to be "mackerel sky (or cirrocumulus)".

In the above weather condition judgment processing, the judgment condition for judging the cell to be "white cloud" may be defined by an average value of the brightness L equal to or more than 180 and less than 240, and the judgment condition for judging the cell to be "overexposure" may be defined by the average value of the brightness L equal to or more than 240. In this case, a judgment may be made that a sky image is overexposed due to backlight and the accuracy of the weather condition judgment processing can be improved.

Figure 13:
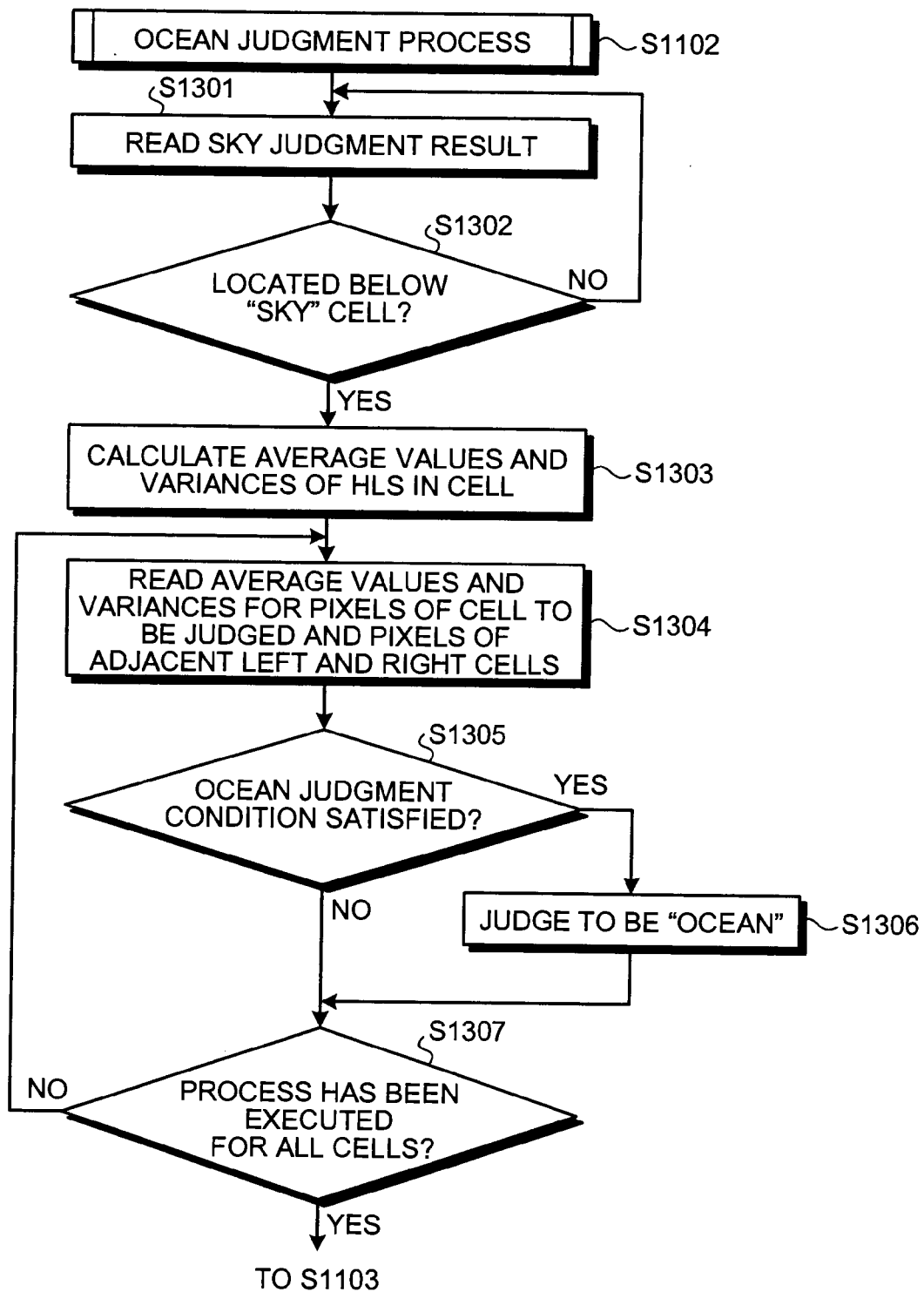
FIG. 13 is a flowchart of ocean judgment processing (step S1102 of FIG. 11) by the on-board apparatus according to the example.

Details of the ocean judgment processing (step S1102 of FIG. 11) by the on-board apparatus 300 according to the example will be described with reference to FIG. 13. FIG. 13 is a flowchart of ocean judgment processing (step S1102 of FIG. 11) by the on-board apparatus according to the example. As depicted in the flowchart of FIG. 13, the CPU 301 reads the sky judgment result of the sky judgment processing depicted in FIG. 12 (step S1301). One cell is selected as a cell to be judged at subsequent step S1302.

The CPU 301 determines whether the cell to be judged is located below the "sky" cells based on the sky judgment result read at step S1301 (step S1302).

If the cell to be judged is not located below the "sky" cells at step S1302 (step S1302: NO), the processing is repeated from step S1301.

If the cell to be judged is located below the "sky" cells at step S1302 (step S1302: YES), the CPU 301 calculates average values and variances of the hue H, the brightness L, and the saturation S of the pixels included in each cell (step S1303). The calculated average values and variances are recorded in the buffer area of the video I/F 311 or a work area of another recording medium, for example.

For the average values and the variances calculated at step S1303, the CPU 301 reads the average values and the variances for the pixels of the cell to be judged and the right and the left cells thereof (step S1304). The average values and the variances are read for the pixels of the one cell to be judged and the pixels of the right and of the left cells thereof. A series of operations from step S1304 to step S1307 is repeated for each cell to be judged.

The CPU 301 then determines, with respect to the one cell to be judged and the right and the left cells thereof, whether the average values of the hue H, the brightness L, and the saturation S satisfy an ocean judgment condition, which is a preset judgment condition (step S1305).

For example, the ocean judgment condition may be set as follows. The hue H, the brightness L, and the saturation S are represented in a range of 0 to 255.

The ocean judgment condition is defined by an average value of the hue H being within a range of ±10 of the average value of the hue H of the "sky" cells, an average value of the brightness L equal to or less than the minimum value of the average value of the brightness L of the "sky" cells, and the average value of the saturation S equal to or more than 60.

If the ocean judgment condition is satisfied based on the above ocean judgment condition at step S1305 (step S1305: YES), the CPU 301 judges that the cell to be judged is an "ocean" cell (step S1306). The result of the judgment is recorded in the buffer area of the video I/F 311 or a work area of another recording medium, for example.

Since such an ocean judgment condition is set based on the average values of the hue H and the brightness L of the "sky" cells, it can be accurately judged that a portion of the scenery included in the cell is the ocean by the ocean judgment processing, reflecting a characteristic that the ocean reflects the color of the sky and turns to a color deeper than the color of the sky. Whether the ocean judgment condition is satisfied is judged for the right and the left adjacent cells in addition to the cell to be judged. Therefore, it can be further accurately judged that a portion of the scenery included in the cell is the ocean by the ocean judgment processing, reflecting a characteristic that the ocean spreads to the right and the left.

The CPU 301 determines whether a series of operations from step S1304 to step S1306 has been performed for all the cells that should be judged (step S1307).

If the ocean judgment condition is not satisfied at step S1305 (step S1305: NO), the processing proceeds to step S1307 to determine whether a series of operations from step S1304 to step S1306 has been performed for all the cells that should be judged (step S1307).

If a series of operations from step S1304 to step S1306 has been performed for all the cells that should be judged at step S1307 (step S1307: YES), the ocean judgment processing at step S1102 of FIG. 11 is terminated and the processing proceeds to step S1103.

If a series of operations from step S1304 to step S1306 has not been performed for all the cells that should be judged at step S1307 (step S1307: NO), the processing from step S1304 is repeated.

Although not described in FIG. 13, if the number of the "ocean" cells is counted among all the cells and the number of the "ocean" cells is equal to or more than a preset threshold value (e.g., ⅕ of the number of all the cells), it may be judged that an ocean view is included in the scenery image.

In this example as described above, since a distant view can be judged from the captured scenery image and the camera can be driven toward the direction of a good view, the camera can be turned to the direction of a good view to capture an image without registration in advance.

Scenery such as the sky, the ocean, mountains, and a night view can be judged with respect to the scenery image captured in the direction of the good view. Therefore, an optimal scenery image can be judged and stored according to conditions such as a good-view index defined by a user or initial setting, enabling only appropriate scenery images to be collected efficiently without wasteful storage scenery images.

As described above, according to the example, a user can automatically capture images of a good view and store appropriate scenery images without operating the camera or registering image capturing points. In particular, since the scenery can be checked after driving, the driver has no need to pay attention to the scenery while driving, facilitating safe driving.

Although not described in the example, a panoramic scenery image may be formed when the movable camera is driven to capture images of scenery by capturing plural scenery images as the camera is driven. Specifically, for example, when a good view point is judged, the panoramic scenery image is captured by driving and turning the movable camera from the front to the side of the vehicle and capturing images at drive intervals of a certain angle. Captured scenery images may be translated and matched to form a panoramic scenery image while the vehicle is moving.

If there are successive good view points along a road, a panoramic scenery image may be formed by plural scenery images at certain traveling distance intervals while the movable camera is fixed toward the direction of the good view instead of capturing images at drive intervals of a certain angle.

Although images of scenery are captured with a camera mounted on a vehicle in the description above, the camera may not be mounted on a vehicle. Specifically, for example, images of scenery may be captured by a stationary camera, etc., to collect scenery images in the direction of a good view. Since a countermeasure against vibrations in the case of mounting on a vehicle may not be taken for a stationary camera, an inexpensive system may be provided.

Although scenery is the object to be captured as an image in this example, the object is not limited to scenery. For example, images of buildings may be captured to collect images of beautiful buildings, enabling a user to collect desired images of a wide variety of objects.

The scenery imaging method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:

1. A scenery imaging apparatus comprising:
   a dividing unit that divides, into a plurality of cells, a scenery image captured in an arbitrary direction, as an initial scenery image, by an image capturing unit;

a calculating unit that calculates respective distances to portions of initial scenery respectively corresponding to the cells;

a determining unit that determines an image capturing direction based on the distances calculated by the calculating unit; and a judging unit that judges, based on the distances calculated by the calculating unit, whether a portion of the initial scenery from the portions of initial scenery corresponding to a cell from the plurality of cells is a distant view, wherein the determining unit determines the image capturing direction based on the portion of the initial scenery from the portions of initial scenery judged to be the distant view.

2. The scenery imaging apparatus according to claim 1, wherein the determining unit determines the image capturing direction based on a numerical quantity of cells in an image area respectively having the portion of the initial scenery from the portions of initial scenery judged by the judging unit to be the distant view, and wherein the image area comprises one or more cells in the initial scenery image from the plurality of cells.

3. The scenery imaging apparatus according to claim 1, wherein the image capturing unit captures, as a pickup scenery image, a scenery image in the image capturing direction determined by the determining unit, wherein the dividing unit divides the pickup scenery image into a plurality of cells, and wherein the judging unit judges, with respect to pickup scenery of the pickup scenery image, whether a portion of the pickup scenery corresponding to a cell from the plurality of cells of the pickup scenery image corresponds to at least one of a sky, an ocean, a mountain, and a night view.

4. The scenery imaging apparatus according to claim 3, wherein the judging unit judges, with respect to cells located on an upper side of the pickup scenery image, whether the portion of the pickup scenery corresponds to the sky based on variances of brightness of a plurality of pixels included in the cells located on the upper side.

5. The scenery imaging apparatus according to claim 3, wherein the judging unit judges whether a portion of the pickup scenery judged not to be the sky is the ocean based on average hue and average saturation of a plurality of pixels included in a cell having a portion of the pickup scenery judged to be the sky.

6. The scenery imaging apparatus according to claim 3, wherein the judging unit judges whether the pickup scenery includes a mountain by detecting a boundary between the sky and scenery that is not the sky through an analysis of color properties with respect to cells that respectively have portions judged not to be the sky and are adjacent to a cell having a portion judged to be the sky.

7. The scenery imaging apparatus according to claim 3, wherein the judging unit judges, with respect to each of the cells, whether the portion of the pickup scenery is a night view based on a numerical quantity of pixel groups distinguished as exceeding a reference, among a plurality of pixel groups distinguished by binarizing pixels using a predetermined value of brightness as a reference.

8. The scenery imaging apparatus according to claim 3, further comprising a storage unit that, depending on a judgment result at the judging unit, stores the pickup scenery image.

9. The scenery imaging apparatus according to claim 8, wherein the storage unit stores and correlates the pickup scenery image with position information concerning the pickup scenery image.

10. A scenery imaging method comprising:

dividing, into a plurality of cells, a scenery image captured in an arbitrary direction, as an initial scenery image, at a capturing of an image;

calculating respective distances to portions of initial scenery respectively corresponding to the cells;

determining an image capturing direction based on the distances calculated at the calculating; and judging, based on the distances calculated at the calculating, whether a portion of the initial scenery from the portions of initial scenery corresponding to a cell from the plurality of cells is a distant view, wherein the determining includes determining the image capturing direction using a processor based on the portion of the initial scenery from the portions of initial scenery judged to be the distant view.

11. A non-transitory computer-readable recording medium that stores therein a scenery imaging program that causes a computer to execute:

dividing, into a plurality of cells, a scenery image captured in an arbitrary direction, as an initial scenery image, at a capturing of an image;

calculating respective distances to portions of initial scenery respectively corresponding to the cells;

determining an image capturing direction based on the distances calculated at the calculating; and judging, based on the distances calculated at the calculating, whether a portion of the initial scenery from the portions of initial scenery corresponding to a cell from the plurality of cells is a distant view, wherein the determining includes determining the image capturing direction based on the portion of the initial scenery from the portions of initial scenery judged to be the distant view.

* * * * *